United States Patent
Fox et al.

(10) Patent No.: US 11,194,788 B2
(45) Date of Patent: Dec. 7, 2021

(54) INVOLVED NODE AVAILABILITY

(71) Applicant: International Business Machines Corporation, Armonk, NY (US)

(72) Inventors: Jeremy R. Fox, Georgetown, TX (US); Liam R. Harpur, Skerries (IE); Chris Kau, Mountain View, CA (US); John Rice, Tramore (IE)

(73) Assignee: International Business Machines Corporation, Armonk, NY (US)

( * ) Notice: Subject to any disclaimer, the term of this patent is extended or adjusted under 35 U.S.C. 154(b) by 164 days.

(21) Appl. No.: 16/186,748

(22) Filed: Nov. 12, 2018

(65) Prior Publication Data

US 2020/0151270 A1    May 14, 2020

(51) Int. Cl.
| | |
|---|---|
| *G06F 16/00* | (2019.01) |
| *G06F 16/23* | (2019.01) |
| *H04L 9/06* | (2006.01) |
| *G06F 16/951* | (2019.01) |
| *G06F 16/2455* | (2019.01) |

(52) U.S. Cl.
CPC ...... *G06F 16/2379* (2019.01); *G06F 16/2455* (2019.01); *G06F 16/951* (2019.01); *H04L 9/0637* (2013.01); *H04L 2209/38* (2013.01)

(58) Field of Classification Search
CPC . G06F 16/2379; G06F 16/2455; G06F 16/951
See application file for complete search history.

(56) References Cited

U.S. PATENT DOCUMENTS

| | | | | |
|---|---|---|---|---|
| 5,911,134 | A * | 6/1999 | Castonguay | H04M 3/36 705/7.12 |
| 9,336,059 | B2 | 5/2016 | Brown et al. | |
| 9,959,138 | B1 * | 5/2018 | Vaish | G06F 9/5011 |
| 2014/0201753 | A1 * | 7/2014 | He | G06F 9/4881 718/104 |
| 2015/0074170 | A1 * | 3/2015 | Steiner | G06Q 10/06 709/202 |
| 2017/0132625 | A1 | 5/2017 | Kennedy | |

(Continued)

FOREIGN PATENT DOCUMENTS

| | | |
|---|---|---|
| WO | 2008067322 A1 | 6/2008 |
| WO | 2017163220 A1 | 9/2017 |

OTHER PUBLICATIONS

Aymen Boudguiga, Nabil Bouzerna, Louis Granboulan, Alexis Olivereau, Flavien Quesnel, Anthony Roger, and Renaud Sirdey, "Towards Better Availability and Accountability for IoT Updates by Means of a Blockchain," 2017 IEEE European Symposium on Security and Privacy Workshops (EuroS&PW), 2017, pp. 50-58.

(Continued)

*Primary Examiner* — Khanh B Pham

(57) ABSTRACT

An example operation may include one or more of receiving a transaction request for a first transaction into a blockchain network, determining one or more potentially linked transactions subsequent to the first transaction, determining one or more nodes required for the first transaction and the one or more potentially linked transactions, determining an availability for the one or more nodes, for example, by analyzing social network usage at the respective nodes, and determining, from the availability of the one or more nodes, a preferred time to initiate the first transaction.

17 Claims, 17 Drawing Sheets

(56) References Cited

U.S. PATENT DOCUMENTS

2017/0132626 A1    5/2017  Kennedy
2018/0097899 A1*  4/2018  A .......................... H04L 67/24

OTHER PUBLICATIONS

Ingo Weber, Vincent Gramoli, Alex Ponomarev, Mark Staples, Ralph Holz, an Binh Tran, and Daul Rimba, "On Availability for Blockchain-Based Systems," 2017 IEEE 36th Symposium on Reliable Distributed Systems (SRDS), 2017, pp. 64-73.

* cited by examiner

100

560

570

580

582

INVOLVED NODE AVAILABILITY

TECHNICAL FIELD

This application generally relates to a database storage system, and more particularly, to involved node availability.

BACKGROUND

A centralized database stores and maintains data in one single database (e.g., database server) at one location. This location is often a central computer, for example, a desktop central processing unit (CPU), a server CPU, or a mainframe computer. Information stored on a centralized database is typically accessible from multiple different points. Multiple users or client workstations can work simultaneously on the centralized database, for example, based on a client/server configuration. A centralized database is easy to manage, maintain, and control, especially for purposes of security because of its single location. Within a centralized database, data redundancy is minimized as a single storing place of all data also implies that a given set of data only has one primary record.

However, a centralized database suffers from significant drawbacks. For example, a centralized database has a single point of failure. In particular, if there are no fault-tolerance considerations and a hardware failure occurs (for example a hardware, firmware, and/or a software failure), all data within the database is lost and work of all users is interrupted. In addition, centralized databases are highly dependent on network connectivity. As a result, the slower the connection, the amount of time needed for each database access is increased. Another drawback is the occurrence of bottlenecks when a centralized database experiences high traffic due to a single location. Furthermore, a centralized database provides limited access to data because only one copy of the data is maintained by the database. As a result, multiple devices cannot access the same piece of data at the same time without creating significant problems or risk overwriting stored data. Furthermore, because a database storage system has minimal to no data redundancy, data that is unexpectedly lost is very difficult to retrieve other than through manual operation from back-up storage.

Transactions on blockchain networks utilize various nodes, as will be described in more detail below. Nodes can be used for submitting, endorsing, validating and distributing data, transactions, etc. Some nodes require user action at the node, e.g. to accept or validate a transaction. Nodes can come and go online/offline for a variety of reasons.

Because blockchain networks can be widely distributed with many involved entities, it can be difficult for a user to anticipate how efficiently a transaction will be undertaken. This can provide a disincentive for the user to undertake the transaction, particularly utilizing the blockchain network. What is required is a system and method for improving the efficiency of a blockchain network.

SUMMARY

One example embodiment provides a system that includes a blockchain network programmed to execute one or more interlinked transactions involving one or more nodes, and a node availability system comprising at least one processor and at least one operatively associated memory, the node availability system programmed to predict, from a blockchain transaction request for the blockchain network, one or more nodes involved in one or more transactions subsequent to the blockchain transaction request, and predict an availability for one or more of the one or more involved nodes, wherein at least one of the blockchain network or the node availability system is programmed to determine, from the predicted availability, a preferred transaction time for the blockchain transaction request.

Another example embodiment provides a method that includes one or more of receiving a transaction request for a first transaction into a blockchain network, determining one or more potentially linked transactions subsequent to the first transaction, determining one or more nodes required for the first transaction and the one or more potentially linked transactions, determining an availability for the one or more nodes, and determining, from the availability of the one or more nodes, a preferred time to initiate the first transaction.

A further example embodiment provides a non-transitory computer readable medium comprising instructions, that when read by a processor, cause the processor to perform one or more of determining one or more nodes required for an interlinked series of transactions subsequent to a first blockchain transaction, determining an availability for the one or more nodes, and determining, from the availability of the one or more nodes, a preferred time to initiate the first blockchain transaction.

DETAILED DESCRIPTION

Figure 1A:
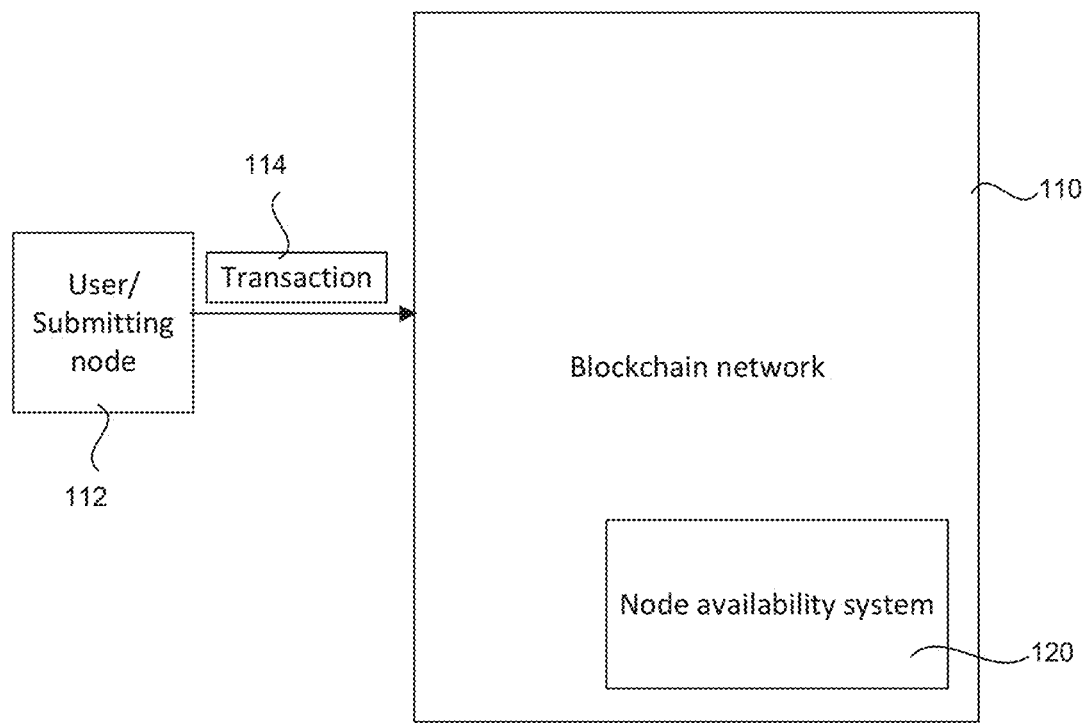
FIG. 1A illustrates a network diagram of a system including a blockchain network, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, components, non-transitory computer readable media, devices, and/or networks, which provide for the determining of an optimal or appropriate time for initiating a transaction or process that involves one or more nodes.

A decentralized database is a distributed storage system which includes multiple nodes that communicate with each other. A blockchain is an example of a decentralized database which includes an append-only immutable data structure resembling a distributed ledger capable of maintaining records between mutually untrusted parties. The untrusted parties are referred to herein as peers or peer nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency. In a public or permission-less blockchain, anyone can participate without a specific identity. Public blockchains often involve native cryptocurrency and use consensus based on various protocols such as Proof of Work (PoW). On the other hand, a permissioned blockchain database provides a system which can secure inter-actions among a group of entities which share a common goal but which do not fully trust one another, such as businesses that exchange funds, goods, information, and the like.

A blockchain operates arbitrary, programmable logic, tailored to a decentralized storage scheme and referred to as "smart contracts" or "chaincodes." In some cases, specialized chaincodes may exist for management functions and parameters which are referred to as system chaincode. Smart contracts are trusted distributed applications which leverage tamper-proof properties of the blockchain database and an underlying agreement between nodes which is referred to as an endorsement or endorsement policy. In general, blockchain transactions typically must be "endorsed" before being committed to the blockchain while transactions which are not endorsed are disregarded. A typical endorsement policy allows chaincode to specify endorsers for a transaction in the form of a set of peer nodes that are necessary for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

Some benefits of the instant solutions described and depicted herein include the ability to reduce or avoid timing mismatches across multiple nodes involved in interlinked transactions of a process by predicting an optimized or appropriate time to conduct a transaction based on the availability of nodes that are likely to be involved in the transactions.

Blockchain is different from a traditional database in that blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein.

One of the benefits of the example embodiments is that it improves the functionality of a computing system by improving the efficiency with which a process of interlinked transactions, in particular blockchain transactions requiring validation by nodes, can be undertaken.

The example embodiments create a functional improvement in how processes and transactions are undertaken, leading to greater communication efficiency, greater certainty in transaction outcome, and overall timeliness of transaction completion.

FIG. 1A illustrates a logic network diagram of components used in a process or transaction network, according to example embodiments. Referring to FIG. 1A, the network 100 includes a blockchain network 110, further details of which are described below. A user 112 may submit a transaction request 114 for a transaction to the blockchain network 110. While a single user is shown, the blockchain network 110 will typically have many users 112 at submitting nodes of a greater computer network. The users may submit and engage in a large variety of transactions and processes using the blockchain network. Many of the submitted transactions will trigger subsequent transactions. This interlinked series of transactions may be a defined series of transactions such as defined by one or more smart contracts, chaincode, etc. The interlinked series of transactions may include a less defined series of transactions but may nevertheless be predictable using methods and prediction models to be described in more detail below. The interlinked series of transactions may include transactions to be executed within the blockchain network and recorded on a blockchain ledger of the blockchain network. The subsequent transactions may also include non-blockchain transactions that may still require the involvement of other nodes of the overall system.

As discussed above, for a series of interlinked transactions, it is becoming increasingly important to ensure that the transactions run smoothly and efficiently. It may therefore be effective to initiate a transaction when the node(s) required to validate the transaction, and any subsequent interlinked transactions, are most likely to be available to validate. To this end, the blockchain network 110 may include a node availability system 120 that is able to predict or otherwise determine the availability of nodes required for the transactions and, using the node availability, determine a preferred time to initiate the transaction.

Figure 1B:
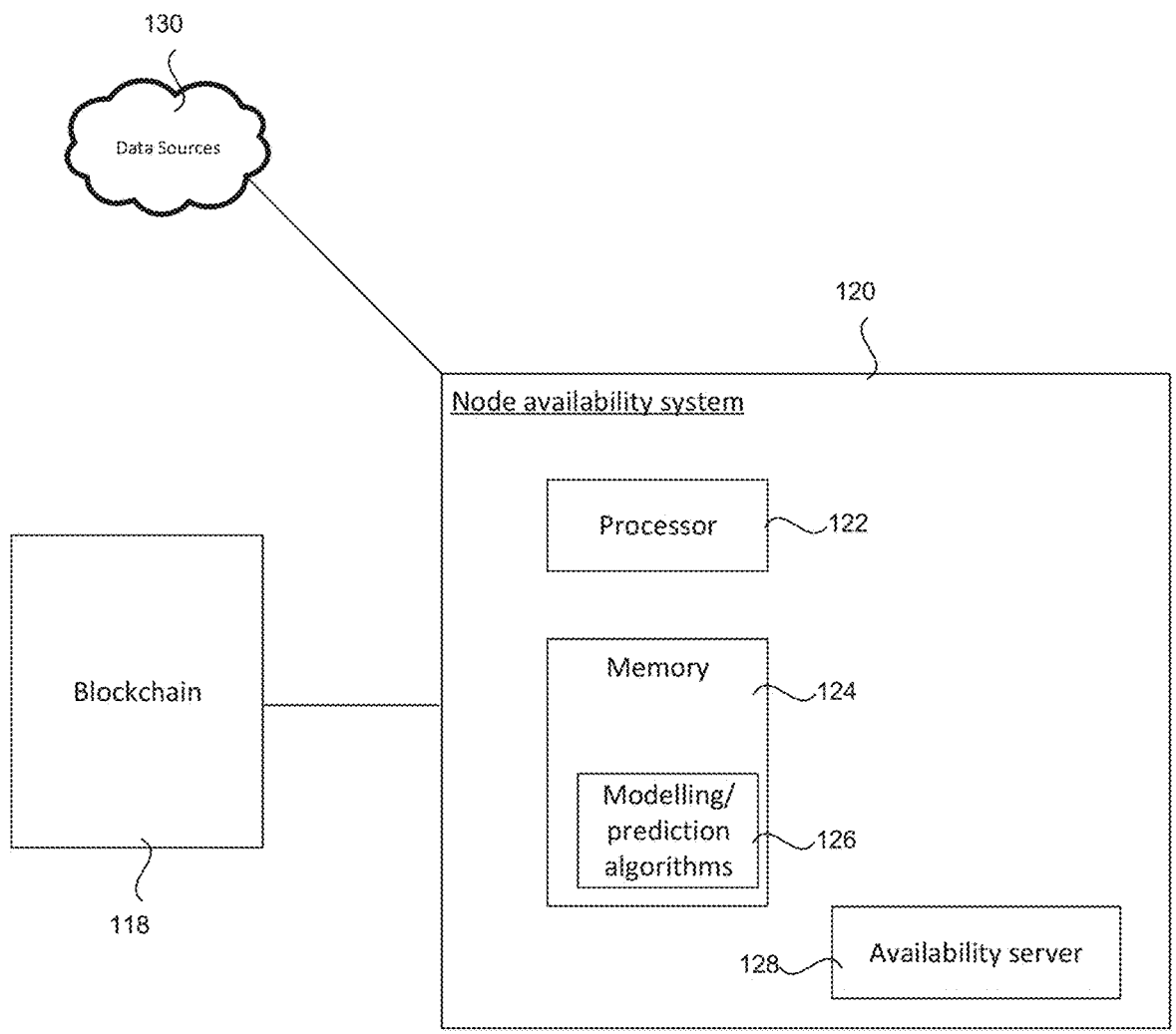
FIG. 1B illustrates a network diagram of node availability system, according to example embodiments.

FIG. 1B shows a network diagram 150 of node availability system 120 as including one or more processors 122 and one or more operatively associated memories 124. The memories 124 may include memory for storing program instructions, code, software etc. for execution by the one or more processors 122. The memories 124 may also include random access memory for use by the processor 122 in executing the program instructions. Specifically, the memory may store one or more prediction and modelling algorithms 126 as will be described in more detail below. The node availability system 120 may receive data regarding the nodes of the network from one or more data sources. The data sources may include data from the blockchain 118 of the blockchain network as well as data from non-blockchain sources 130, such as third party internet servers and the like.

The node availability system 120 may implement an availability server 128 that is able to receive availability requests from nodes or other components of the blockchain network and respond with node availability and/or preferred transaction execution times.

The node availability system may be programmed to forecast transactions, the nodes required for the forecast transactions, availability of the forecast nodes and/or preferred transaction times based on the node availability, as will be described in more detail below.

The node availability system 120 may be implemented as a centralized system and receive requests from multiple nodes, users, etc. within the system and provide responses indicating of node availability and/or for preferred transaction times, as will be described in more detail below. Alternatively, the node availability system 120 may be a distributed system and implemented at various nodes within the network.

Figure 2A:
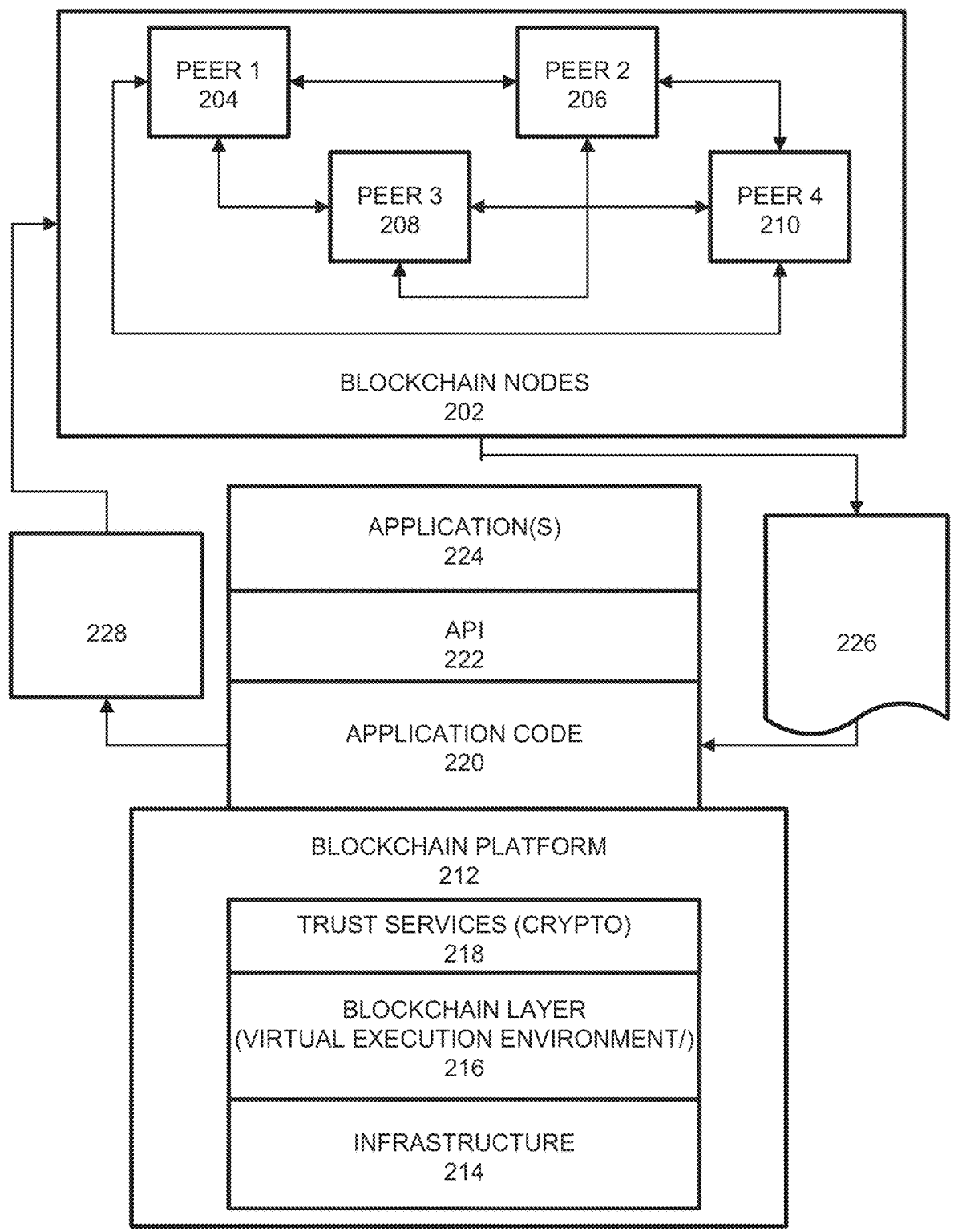
FIG. 2A illustrates an example peer node configuration, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (these four nodes are depicted by example only). These nodes participate in a number of activities, such as blockchain transaction addition and validation process (consensus). One or more of the blockchain nodes 204-210 may endorse transactions based on endorsement policy and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, the information 226 such as social networking usage at a node may be processed by one or more processing entities (e.g., virtual machines) included in the blockchain layer 216. The result 228 may include a predicted availability for the node that can be used to estimate a preferred transaction time for executing a transaction. The physical infrastructure 214 may be utilized to retrieve any of the data or information described herein.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details. In FIG. 2A, blockchain nodes may contribute social media usage data 226 which is processed by application code. One function may be to create node availability data that may be provided to one or more of the nodes 204-210 and used for determining preferred process transaction times.

Figure 2B:
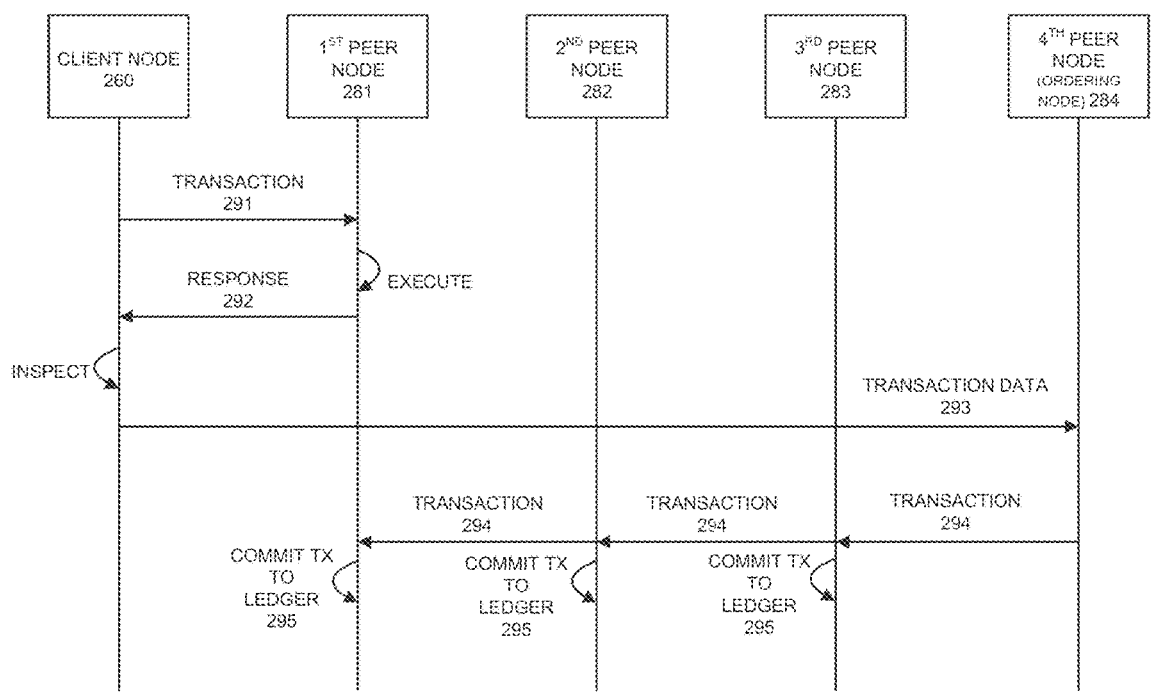
FIG. 2B illustrates a further peer node configuration, according to example embodiments.

FIG. 2B illustrates an example of a transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client 260 may include an application leveraging a supported software development kit (SDK), such as NODE, JAVA, PYTHON, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
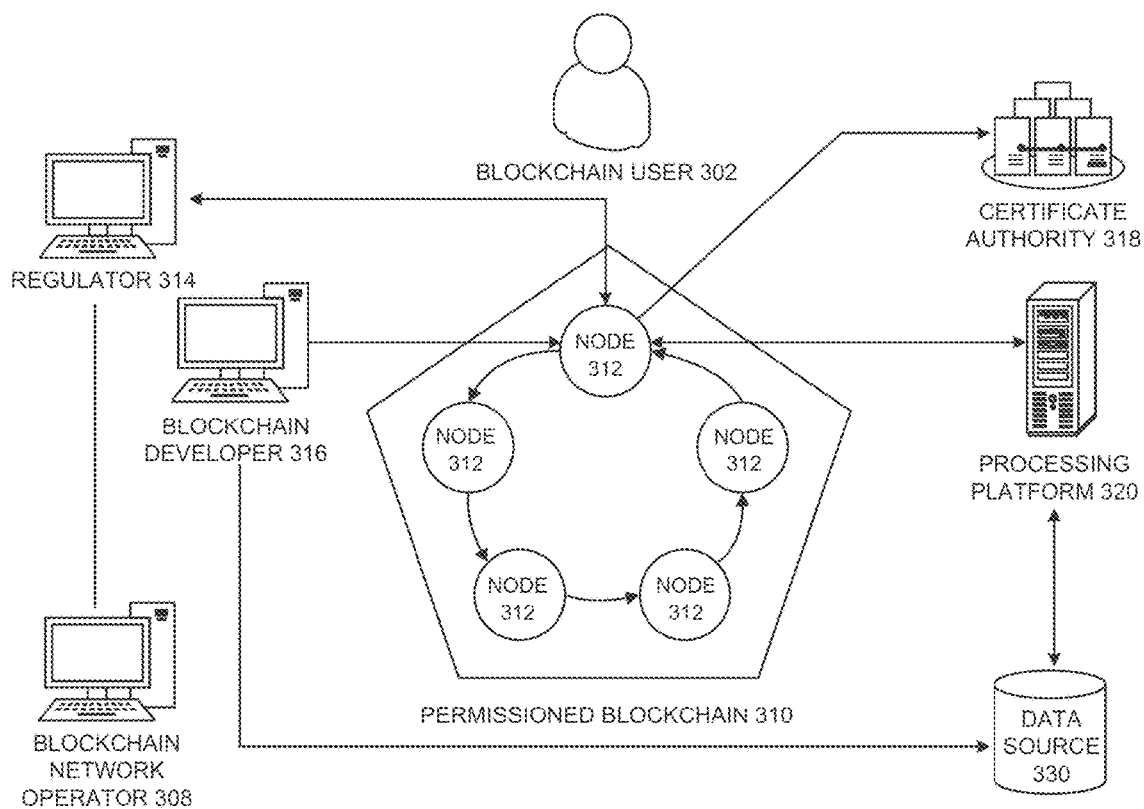
FIG. 3 illustrates a permissioned network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manage member permissions, such as enrolling the regulator system 310 as an "auditor" and the blockchain user 302 as a "client." An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4:
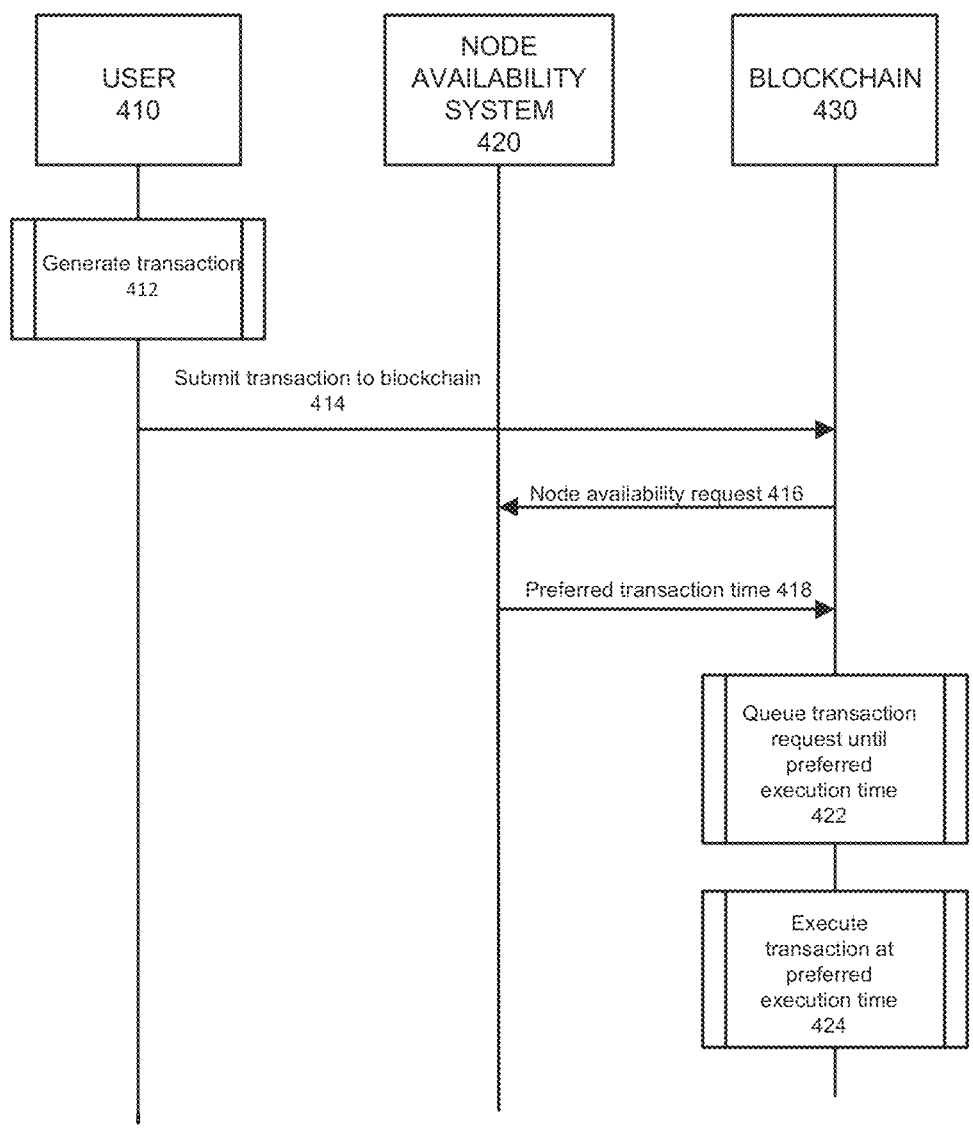
FIG. 4 illustrates a system messaging diagram, according to example embodiments.

FIG. 4 illustrates a system messaging diagram for performing transaction timing optimization in accordance with an embodiment. Referring to FIG. 4, the system diagram 400 includes generating a blockchain transaction request 412 by a user/node 410 and submitting the transaction request 414 to the blockchain network 430. The blockchain network 430 receives the request and accesses the node availability system 420 by submitting a node availability request 416. The node availability request 416 may specify one or more parameters of the transaction that enable the node availability system 420 to determine the nodes required for the transaction(s). The node availability system responds with a preferred transaction time 418. The blockchain network 430 then queues the transaction 422 and executes the transaction at the preferred transaction time 424.

Blockchain and distributed ledger technology is foreseen to be utilized in a large variety of transactions and processes. The transactions can be financial or non-financial transactions. It is envisaged that even more localized workflow transactions will utilize a blockchain, for example when an accountant approves a payment. A single transaction or process will involve at least two and often many entities.

As a blockchain network grows in scope and complexity, more transactions and in particular more types of transactions will be recorded into the blockchain involving more and more nodes. For example, an accountant approving a payment may be recorded as a blockchain transaction requiring validation. With the increase in size of the node network and scope of transactions to be recorded into the blockchain, the interrelatedness of transactions and complexity of the relationships also increases.

In a closely inter-linked and closely coupled system, delays or mismatches in timing can have "butterfly effects" e.g. if an approval is late by x hours, that might mean funds are unavailable for an entity at a crucial time. So finding the optimal time to create a "straight-run" of linked transactions, or steps within a transaction process, is becoming increasingly important.

To improve the efficiency of a transaction or process, it may be desirable to know the availability of the entities or nodes involved in the transaction or process. In embodiments to be described below, there will be described a system for forecasting availability of involved nodes to expedite a process, including a blockchain transaction. For example, a result of the systems and methods to be described may be to determine that x date and time is the best time to initiate a transaction as a blockchain transaction or content will be communicated/queued at a time when the recipient/entity/node is likely to be able to easily validate it to/with other parties.

By determining a likely optimal time to conduct a transaction, the transaction, for example, may not arrive for processing until the entity/recipient/entity/node is likely available to undertake their role in the process. In one or more embodiments, availability may be determined by analyzing social network usage at the respective nodes. If an entity is available socially, e.g. entity 1 has logged into and is active on various social networking accounts such as Facebook, LinkedIn, WhatsApp, etc. then the recipient/ entity/node is likely able to validate the transaction. An awareness aspect may state only send transactions if the recipient/entity/node is in a maximal position to validate, e.g. the recipient/entity/node is usually available on social networks at his time, or has the most social networking logins working, and is thus likely to be in a position to validate the transaction Additionally, a recipient/entity/node may advertise that all of their colleagues may want to send transactions when that criteria is met. When sending transactions, the sender may receive notification of differential aspects and changed behavior when handling the transactions.

Figure 5A:
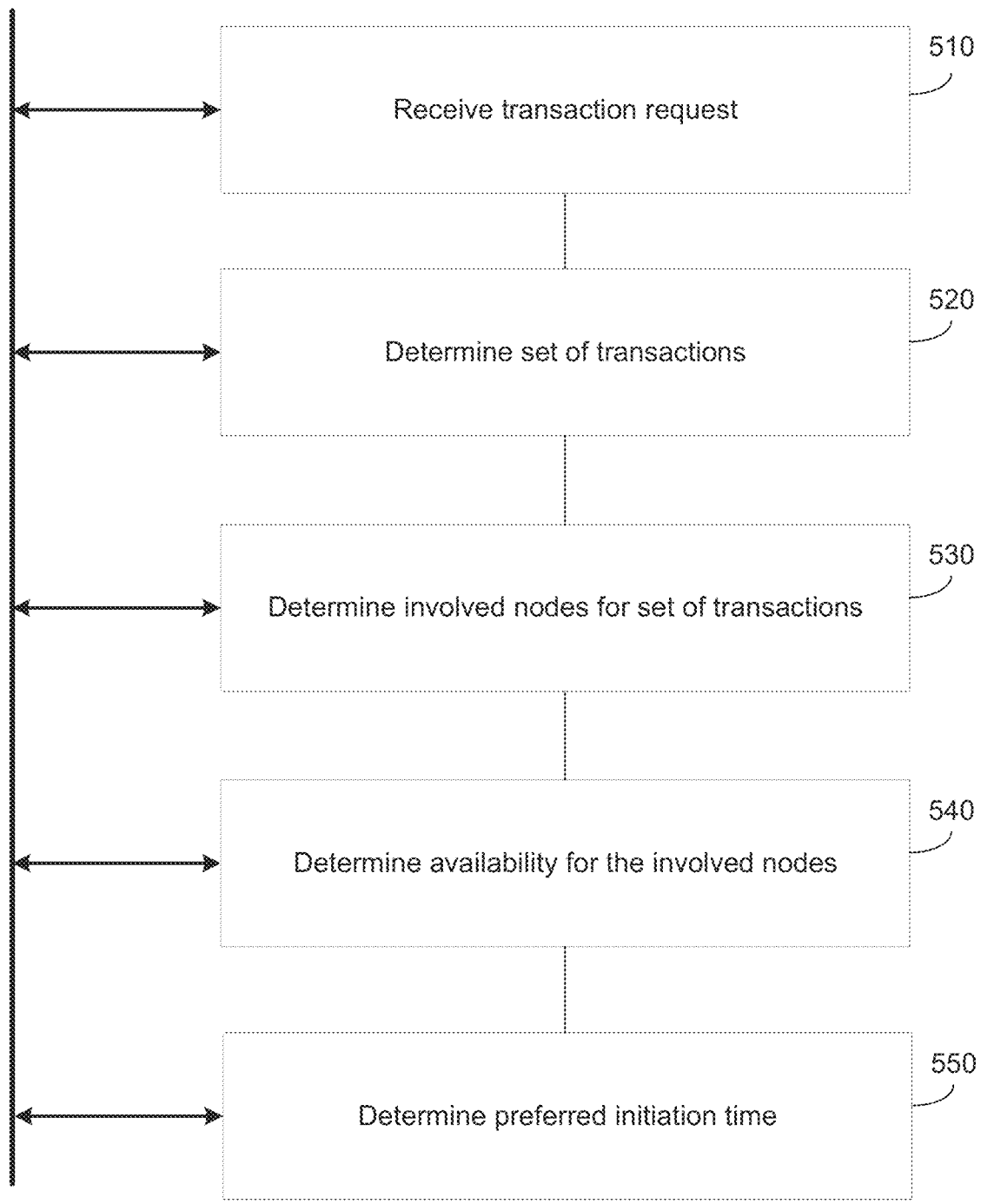
FIG. 5A illustrates a flow diagram, according to example embodiments.

FIG. 5A illustrates a flow diagram 500 of an example method of . . . in a blockchain, according to example embodiments. Referring to FIG. 5A, the method 500 may include receiving a transaction request for a first transaction into a blockchain network 510, determining a set of transactions subsequent to the transaction request 520, determining one or more nodes required for the set of transactions 530, determining an availability for the one or more nodes 540, and determining, from the availability of the one or more nodes, a preferred time to initiate the first transaction 550.

In one embodiment, a field may be added to the transaction request that specifies a time for the transaction. The determined preferred time for the transaction may be added in this field. The transaction request may be queued until the time specified in the transaction time field of the transaction request.

The set of transactions that stem from the initial transaction request may be a defined and established set of transactions with defined and established involved nodes. For example, the process may be embodied in one or more smart contracts, chaincode, etc. of a blockchain network. In other embodiments, the process may be an inferred, modelled or predicted set of transactions with inferred or predicted nodes, as will be described in more detail below. In one particular embodiment, the process may be a blockchain process having one or more steps requiring validation and/or endorsement by one or more blockchain peers. The forecast interlinked transactions may include blockchain transactions and non-blockchain transactions and may involve blockchain nodes as well as non-blockchain nodes. A node typically has an input, processing and output. Nodes may be automated programmed nodes, or nodes may require people providing input to a computer or database.

In an information network, data from a myriad of sources can be collated and processed to reveal relationships, linkages and causalities between the data. In a transaction network where elements of a transaction are undertaken by multiple nodes, data analysis, for example by a neural network, may be used to develop transaction or process models. The transaction model may then be used to predict, from an initial transaction request, a process such as a probable series of interlinked transactions and the nodes that are likely to become involved in the transactions and various knock-on effects. For example, consider a repair network for repairing a product, such as a dishwasher. A repair transaction may involve a discussion between two or more customers or users, one or both of whom may contact a supplier. The supplier may contact a wholesaler and/or repair center. The repair center may contact a parts supply center who may contact a logistics company for delivering spare parts to the customer and/or repair center. Other nodes that may be involved in the process may include invoicing and accounting nodes, warehouse ordering nodes, manufacturing nodes, etc. In this example, the communications may occur across multiple disparate communications channels. Therefore, in isolation, it may not be possible to infer that the initial customer discussion or contact to the supplier is in any way linked to the parts delivery to the service center. However, by collating the communications into a unitary system, for example a blockchain network, and then analyzing the communications across multiple transactions, users, parties, etc. patterns may emerge from which inferences may be drawn. The neural network may be able to predict that if a certain type of user creates a certain type of transaction then this may set off a series of linked transactions across the network with various knock-on effects in other nodes of the transaction network.

That is, the data can be analyzed to provide an estimate of what has happened, causal connections, linkages, etc. These estimates, patterns, inferred relationships etc. can be further processed to build a model of what is likely to occur in response to various transaction requests.

The data can be collated into a database for processing by the neural network. In one or more embodiments, the database may be a blockchain within a blockchain network, such as the blockchain network 110 of FIG. 1A. A blockchain network may be beneficial for storing data because a blockchain may be readily accessed by multiple nodes and data sources across a communications network. Data sources may readily contribute transaction content to the blockchain ledger and different processing units may filter and process the data to serve their particular purposes. A further advantage is that by incorporation into a blockchain, the data is immutable and does not require a centralized authority.

The repair example provided herein is used by way of example to demonstrate that for many transactions, actions at one point in a process may have consequences along the process line. If the nodes are closely coupled, then timing mismatches can cause significant delays to the overall process. It will be apparent to the person skilled in the art that the embodiments to be described herein should not be limited to any one type of transaction, nor types of nodes, parties, communications, etc.

Intelligent processing of the data received into the database such as a blockchain, e.g. by a neural network, may allow models to be developed and then predictions made based on those models. For example, by analyzing various communications, models may be developed that can anticipate the nodes that may be involved in a transaction or process, and the relationships of those nodes to each other, in particular the timing relationships.

Once the sets of interlinked transactions have been defined, either by explicit definition or by modelling, the system can then be used to optimize transaction processes by determining preferred times for executing transactions. The optimization process may start when a transaction request is generated. Parameters of the transaction request may be analyzed to determine a likely series of subsequent transactions. In one or more embodiments, the optimization process determines the nodes to be involved in the transaction(s) and the availability of those nodes. The node availability is used to determine an appropriate time for initiating the process, starting with the initial transaction. Optimization may be based on one or more parameters including, without limitation, time, cost, minimal time/cost of key stages, etc.

In various embodiments, node availability may be determined by analyzing a node's social networking usage. In one embodiment, server logs may be parsed, e.g. using LogEntries API to extract data, either in real time or in batch mode. Typical raw data might be like the following:

```
xml version = "1.0"?> <?xml stylesheet type='text/xsl' href='MessageLog.xsl'?> <LogFirstSessionID="1"
LastSessionID="1"><Message Date="20/01/2006" Time="18:36:33" DateTime="2006
-
01
-
20T18:36:33.281Z"SessionID="1"><From><User
FriendlyName="jonny_hot_pants@somewhere.com"/></From><To><User
FriendlyName="Hi 2 Ya"/></To><Text Style="font
-
family:MS Shell Dlg; color:#000000; ">hello
h</Text></Message><Message Date="20/01/2006" Time="18:36:42"
DateTime="2006
-
01
-
20T18:36:42.750Z" SessionID="1"><From><User FriendlyName="Hi 2
Ya"/></From><To><User
FriendlyName="jonny_hot_pants@somewhere.com"/></To><Text Style="font
-
family:MS Shell Dlg;
color:#000000; ">how ru</Text></Message></Log
```

Use of the Watson Alchemy API can be used to convert the logs to an actionable/usable format, for example, to show the available times at a summarized level:

```
<date/timesmap> userA entered workspace1
<date/timesmap + 5 seconds> userA added 5 lines of text in workspace1
related to the sales category
<date/timesmap + 45 seconds> userA exited workspace1
```

Figure 5B:
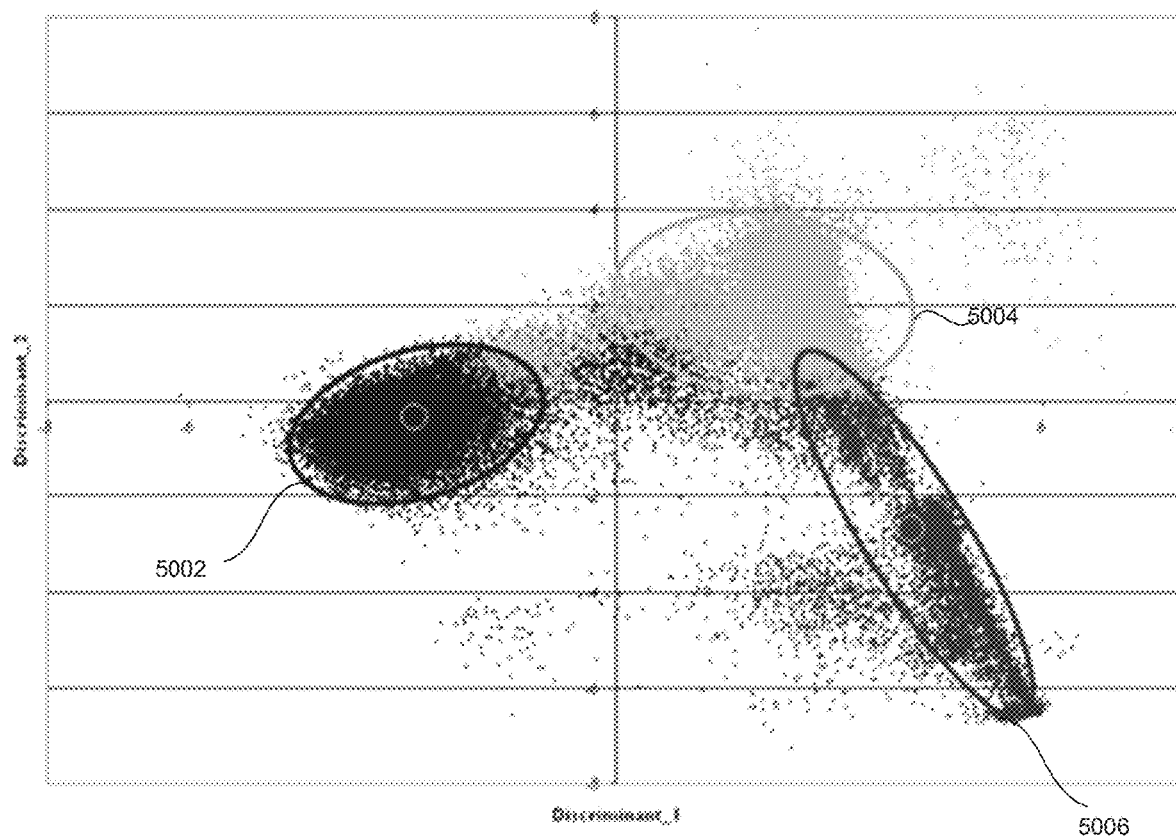
FIG. 5B illustrates a discriminant analysis diagram, according to example embodiments.

The data is collected historically across multiple users/entities/nodes and then the data can be pivoted across users to get aggregate information for all users/groups. Tools like Statistical Package for the Social Science (SPSS) (or Microsoft Excel in a basic implementation) can be used to import the data and pivot on defined fields to gain insight on the topic and associated activity. The data may be further processed using discriminate analysis to visualize availability. FIG. 5B shows an example of a visual representation of the discriminant analysis 560. In the example of FIG. 5B, each dot might represent a user's activity with the color representing the transaction type/topic. FIG. 5B shows three different transaction types/topics which can be roughly grouped by circles 5002, 5004, 5006. FIG. 5B shows that there is a close correlation in timing between the group represented by circle 5004 and circle 5002. For example, assume the domain of the potential transaction is "till receipts". The system can see for all similar transactions (across thousands of shops) that three entities are involved. The customer represented by color 1 (group 5006), the Till Operator represented by color 2 (group 5004) and the Backend System by color 3 (group 5002). In this example, FIG. 5B indicates that there is a close timing relationship between the till operator and the Backend system. Such correlations may be used for optimizing timing of transactions.

Figure 5C:
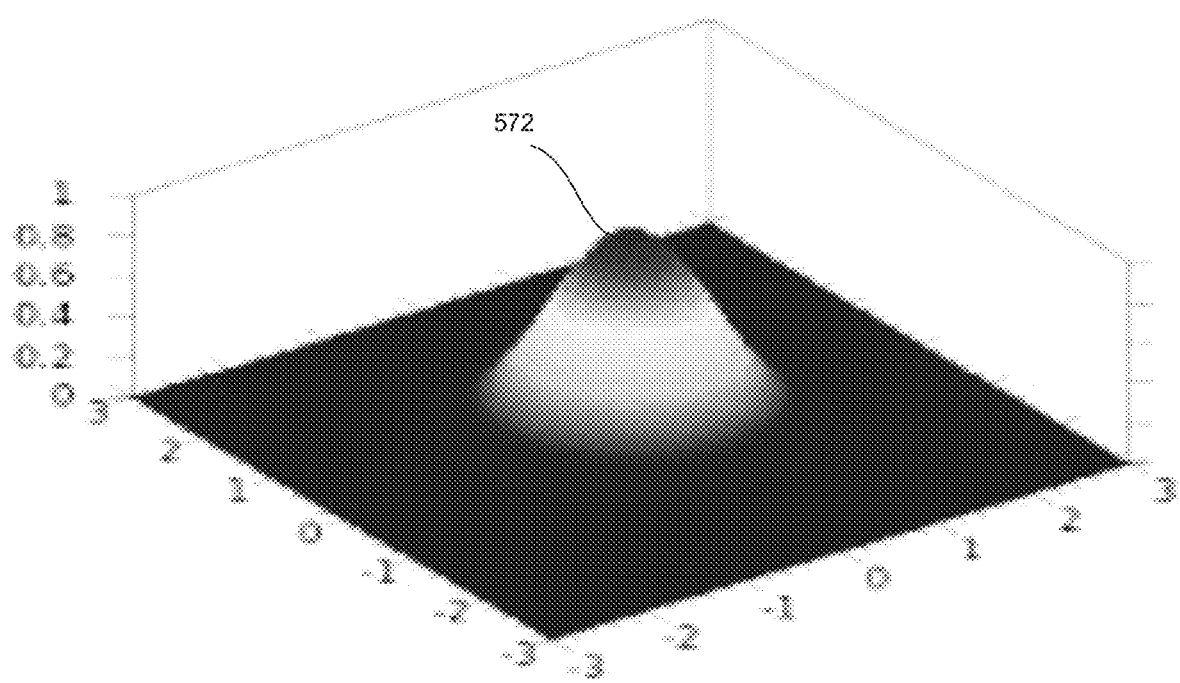
FIG. 5C illustrates a gaussian curve after the discriminant analysis, according to example embodiments.

Further analysis of the same data may help to ascertain peaks and troughs for when the activity takes place, such as the average time to interact on transaction-TypeX. In a specific example, the analysis may determine that at 11 am the aggregate time to interact is 11:30 am. In one embodiment, a Gaussian curve may be used to ascertain with specified degree of probability, an interaction time. FIG. 5C shows an example of the gaussian plot 570 with the peak 572 corresponding to a specific time, or more particularly, a time range.

In one embodiment, an availability server, e.g. the availability server 128 within node availability system 120, may maintain the status of a user's different social networking sites availability. Node availability may be determined by sending a query to the availability server. In an alternative embodiment, availability may be inferred from historical records. For example, if userX usually posts to Facebook at 7 pm, it may be inferred that userX is available to partake in the process at that time, e.g. to validate a part of the process, disseminate information, etc.

Node availability may be used by an optimization model to determine an appropriate time for initiating a process. As discussed above, it is becoming increasingly important in a closely inter-linked and coupled system to avoid delays and mismatches in timing and to provide a straight-run of linked transactions within an overall process. In one embodiment, an artificial neural network (ANN) may be used to implement an optimization model that determines an appropriate time to initiate a process of linked transactions.

ANN Architecture:

Artificial neurons and connections typically have a weight that adjusts as learning proceeds. The weight increases or decreases the strength of the signal at a connection. Typically, artificial neurons are organized in layers. Different layers may perform different kinds of transformations on their inputs. Signals travel from the first (input), to the last (output) layer, possibly after traversing the layers multiple times.

The following pseudo code demonstrates an embodiment of an implementation of an ANN model for optimizing a transaction initiation time.

```
# GRADED FUNCTION: model
    def model(data, X_train, Y_train, X_test, Y_test, num_iterations = 2000,
    learning_rate = 0.5, print_cost = False):
    """"""
    Builds the logistic regression model
```

```
    Arguments:
data -- text corpus
    X_train -- training set represented by a numpy array of topic
    Y_train -- training labels represented by a numpy array (vector) of topic
    X_test -- test set represented by a numpy array of topic
    Y_test -- test labels represented by a numpy array (vector) of topic
    num_iterations -- hyperparameter representing the number of iterations to
optimize the parameters
    learning_rate -- hyperparameter representing the learning rate used in the
update rule of optimize( )
    print_cost -- Set to true to print the cost every 100 iterations
    Returns:
    d -- dictionary containing information about the model.
    """
    ### START CODE HERE ###
    # initialize parameters with zeros
    w, b = initialize_with_zeros(X_train.topic[0])
    # Gradient descent
parameters, grads, costs = optimize(w, b, data, X_train, Y_train, num_iterations,
learning_rate, print_cost = False)
    # Retrieve parameters w and b from dictionary "parameters"
    w = parameters["w"]
    b = parameters["b"]
    # Predict test/train set examples
    Y_prediction_test = predict(w, b, data, X_test)
    Y_prediction_train = predict(w, b, data, X_train)
    ### END CODE HERE ###
    # Print train/test Errors
    print("train accuracy: { } %".format(100 - np.mean(np.abs(Y_prediction_train -
Y_train)) * 100))
    print("test accuracy: { } %".format(100 - np.mean(np.abs(Y_prediction_test -
Y_test)) * 100))
    d = {"costs": costs,
        "Y_prediction_test": Y_prediction_test,
        "Y_prediction_train" : Y_prediction_train,
        "w" : w,
        "b" : b,
        "learning_rate" : learning_rate,
        "num_iterations": num_iterations}
    return d
```

The model is used to determine the optimum times of the proposed transaction. The following code snippet provides an embodiment of how this could be implemented.

```
# GRADED FUNCTION: predict
    def predict(w, b, X):
        """
        Predict whether the proposed time used needs change (1) or not (0) using
learned logistic regression parameters (w, b)
        Arguments:
        w -- weights, a numpy array of size
        b -- bias, a scalar
        X -- data of size
        Returns:
        Y_prediction -- a numpy array (vector) containing all predictions (0/1) for the
examples in X
        """
        m = X.topic[1]
        Y_prediction = np.zeros((1,m))
        w = w.ratetopic(X.topic[0], 1)
        # Compute vector "A" predicting the log level change
        ### START CODE HERE ###
        A = sigmoid(np.topic(w.T,X)+b)
        ### END CODE HERE ###
        for i in range(A.topic[1]):
          # Convert probabilities A[0,i] to actual predictions p[0,i]
          ### START CODE HERE ###
          if A[0,i]<= 0.5:
              Y_prediction[0,i]=0
          else:
              Y_prediction[0,i]=1
          ### END CODE HERE ###
        assert(Y_prediction.topic == (1, m))
        return Y_prediction
In [ ]:
```

```
currentDRLevel = lookupDRLevel(productName);
optimumDRLevel = DREvent.getDRLevel( );
if currentDRLevel < optimumDRLevel :
deamon.changeDRLevel(productName, DREvent.getDRLevel( ));
else :
#Determine if a given duration is passed
if deamon.durationPassed(productName, DREvent.getDuration( )):
deamon.restoreDRLevel(productName)
```

The model can be embodied through the architecture of collaboration applications such as WhatApp or Google that monitors current connectivity of people and real-time chat discourse to infer the required transaction time.

With the model embodied to the architecture of a collaboration channel, the real-time chat discourse is monitored and used to do the transaction time prediction as an important parameter. This can help to pre-control the transaction time before the transaction commences.

The code snippet below shows how this could be implemented.

In [ ]:

```
if matchesChangeDRKeyword(message_space) :
#Look up product Name from a given message
productName = lookupProductFromMessage(message_space)
#Construct data input for model
X = constructModel(message_space, productName);
#Predict optimum log level and durations
DREvent = model.predict(w, b, X)
return logEvent;
```

If the optimization process is implemented in a blockchain, a field may be added to the blockchain queue that correlates to a preferred execution time.

Blockchain processes that implement the transaction timing optimization as described herein may become more efficient. Uses can expect that their transaction is more likely to be validated in a timely fashion, in particular where the transaction requires many closely linked nodes.

A user/business may configure the timing optimization functionality as herein described in their blockchain systems to be enabled or not—or in what circumstances to be enabled e.g. enable this functionality for senior managers. Other configurable parameters include the particular organizational and social network data sources that are used for determining node availability, e.g. WhatsApp, Google, Facebook, Messenger, etc.

For a distributed system, the transaction sender may be restricted to having existing tools to monitor the availability status (or inferred status) using local tools.

Figure 5D:
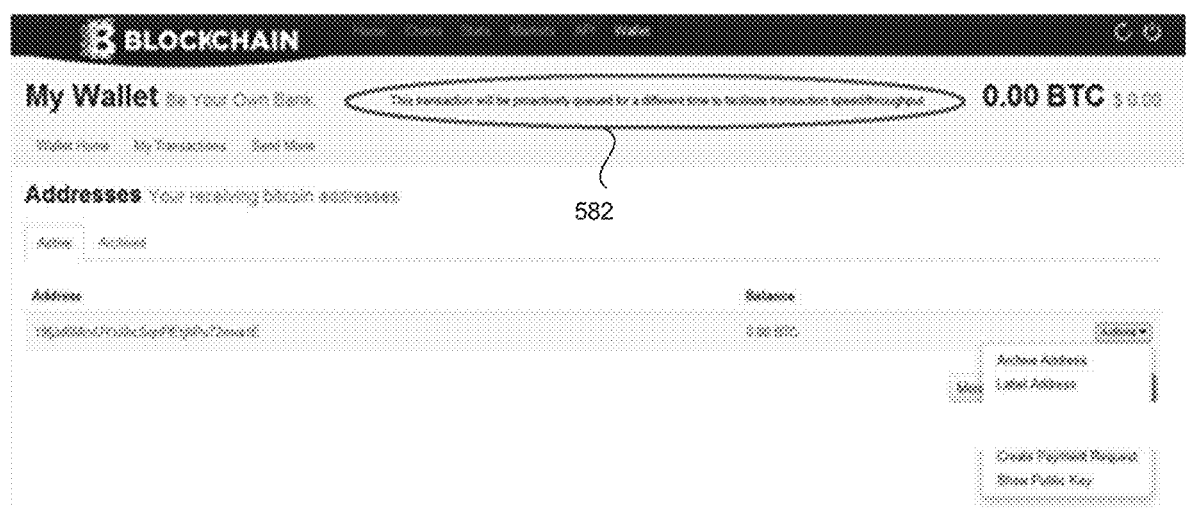
FIG. 5D illustrates an example system message, according to example embodiments.

In one embodiment, a matching engine strives to overlap, for the validator, the communication channel concurrent availability with the intended social network availability. For example, the communication channel (userB@gmail.com) should be in use (or likely to be in use) by userB in order to access the transaction, additionally userB must have Facebook and other social sites open. The matching engine may build a statistical distribution of the availability of the different channels for the validators. The distribution allows statements like the following to be inferred: "userA is at the most social at 2 pm and has the maximal number of social channels available". If the distribution is not interrogated then a point in time analysis must be undertaken. The social network and the heartbeat of communication (e.g. e-mail and so forth between users) allows one to see the interconnectedness of multiple users and crucially the optimal timings of communications between a set of potential users A user when composing/sending a transaction may get notified of the preferences/rules that are set by the recipient/validator. The sender may explicitly set a transaction that the transaction is subject to this changed behavior. In addition, where a transaction is queued according to an optimized timing parameter, the sender may receive a notification 580 as depicted in FIG. 5D that indicates 582 that a transaction has been queued.

Any node within the transaction chain may use the system to determine an optimal time, or at least an appropriate time, to initiate the transaction from their point of view.

Figure 6A:
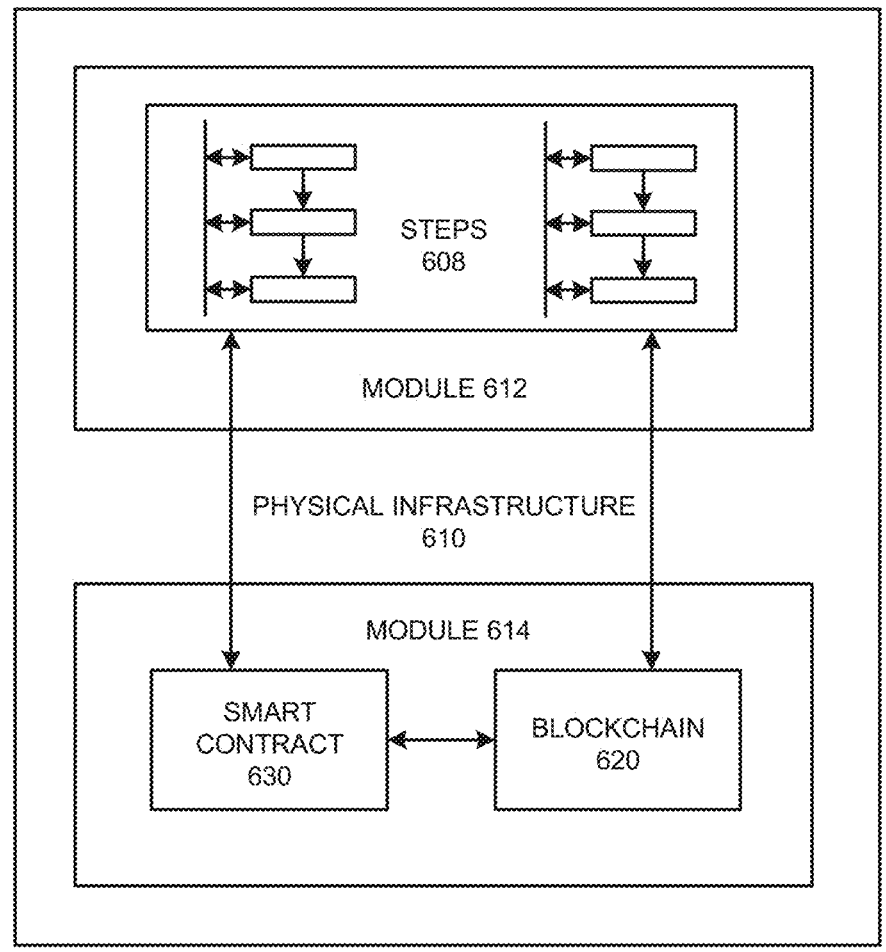
FIG. 6A illustrates an example system configured to perform one or more operations described herein, according to example embodiments.

FIG. 6A illustrates an example system 600 that includes a physical infrastructure 610 configured to perform various operations according to example embodiments. Referring to FIG. 6A, the physical infrastructure 610 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6B:
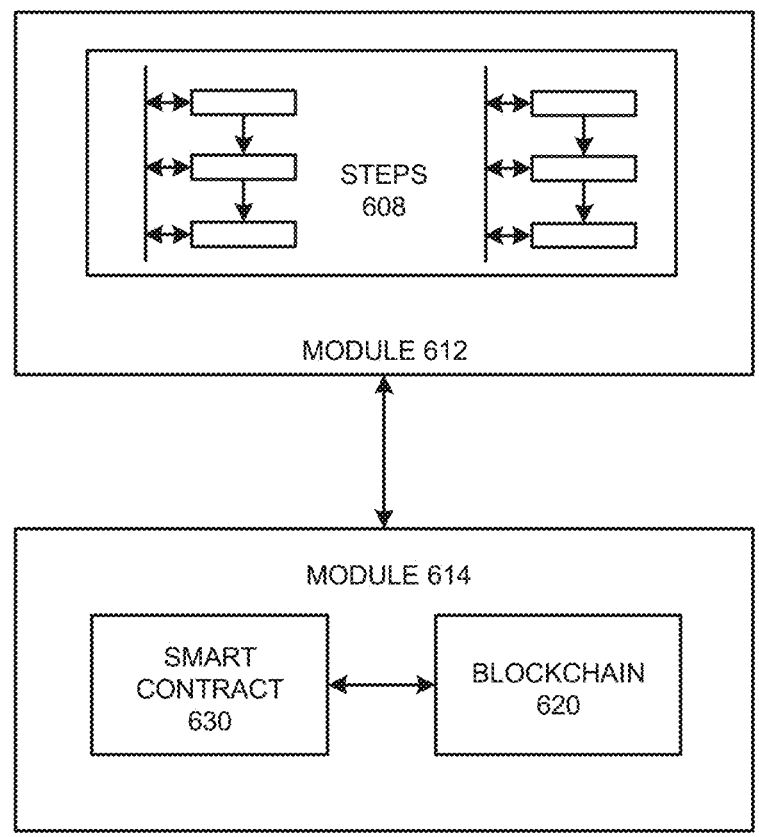
FIG. 6B illustrates a further example system configured to perform one or more operations described herein, according to example embodiments.

FIG. 6B illustrates an example system 640 configured to perform various operations according to example embodiments. Referring to FIG. 6B, the system 640 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6C:
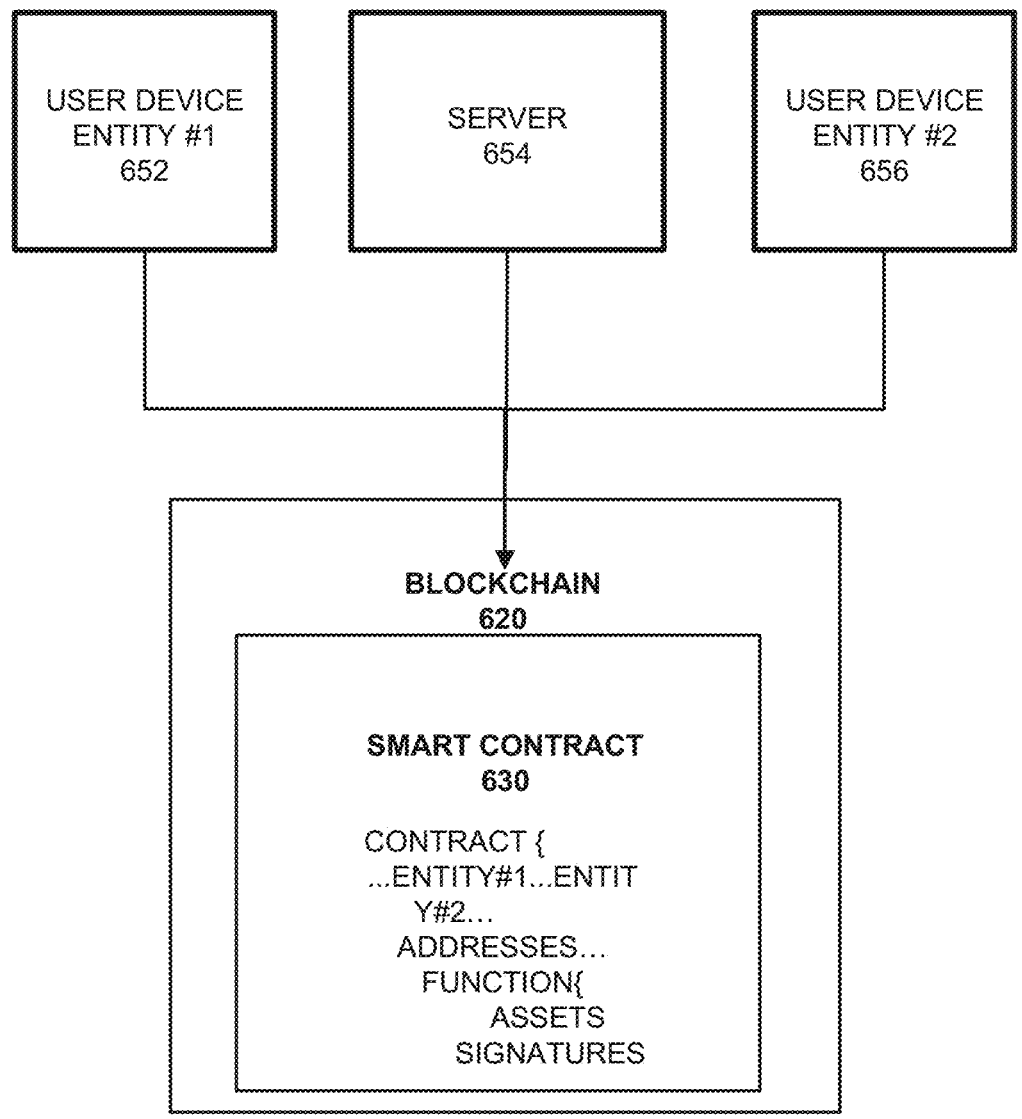
FIG. 6C illustrates a smart contract configuration among contracting parties and a mediating server configured to enforce the smart contract terms on the blockchain according to example embodiments.

FIG. 6C illustrates an example smart contract configuration among contracting parties and a mediating server configured to enforce the smart contract terms on the blockchain according to example embodiments. Referring to FIG. 6C, the configuration 650 may represent a communication session, an asset transfer session or a process or procedure that is driven by a smart contract 630 which explicitly identifies one or more user devices 652 and/or 656. The execution, operations and results of the smart contract execution may be managed by a server 654. Content of the smart contract 630 may require digital signatures by one or more of the entities 652 and 656 which are parties to the smart contract transaction. The results of the smart contract execution may be written to a blockchain 620 as a blockchain transaction. The smart contract 630 resides on the blockchain 620 which may reside on one or more computers, servers, processors, memories, and/or wireless communication devices.

Figure 6D:
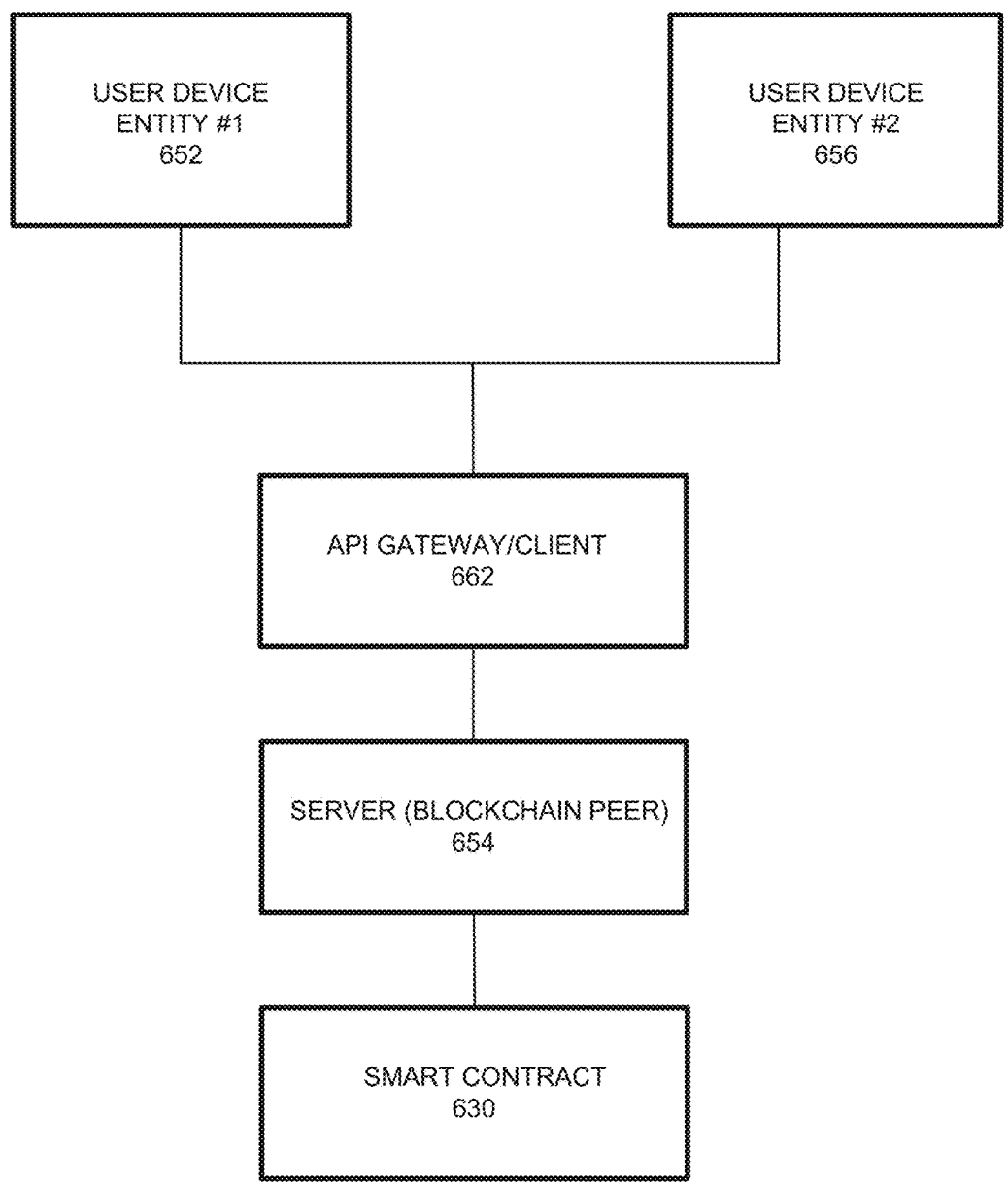
FIG. 6D illustrates another an additional example system, according to example embodiments.

FIG. 6D illustrates a common interface 660 for accessing logic and data of a blockchain, according to example embodiments. Referring to the example of FIG. 6D, an application programming interface (API) gateway 662 provides a common interface for accessing blockchain logic (e.g., smart contract 630 or other chaincode) and data (e.g., distributed ledger, etc.) In this example, the API gateway 662 is a common interface for performing transactions (invoke, queries, etc.) on the blockchain by connecting one or more entities 652 and 656 to a blockchain peer (i.e., server 654). Here, the server 654 is a blockchain network peer component that holds a copy of the world state and a distributed ledger allowing clients 652 and 656 to query data on the world state as well as submit transactions into the blockchain network where, depending on the smart contract 630 and endorsement policy, endorsing peers will run the smart contracts 630.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components.

Figure 7A:
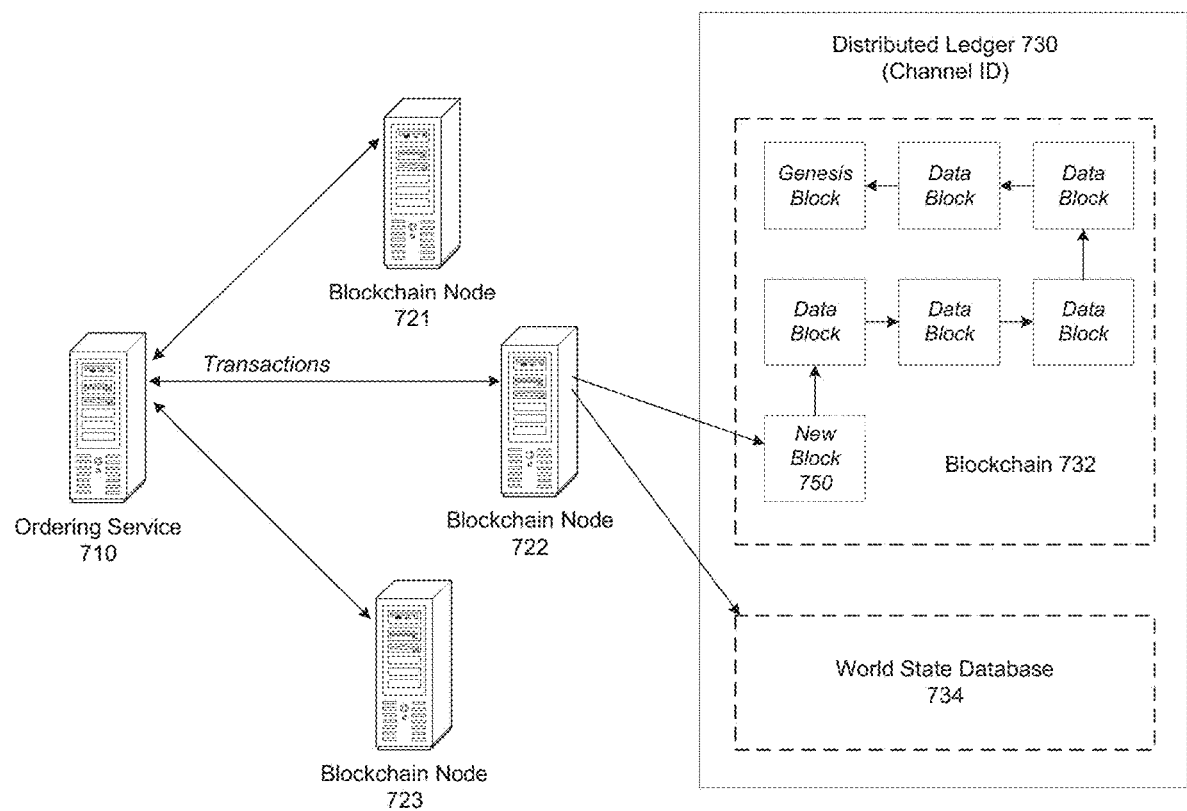
FIG. 7A illustrates a process of new data being added to a database, according to example embodiments.
Figure 7B:
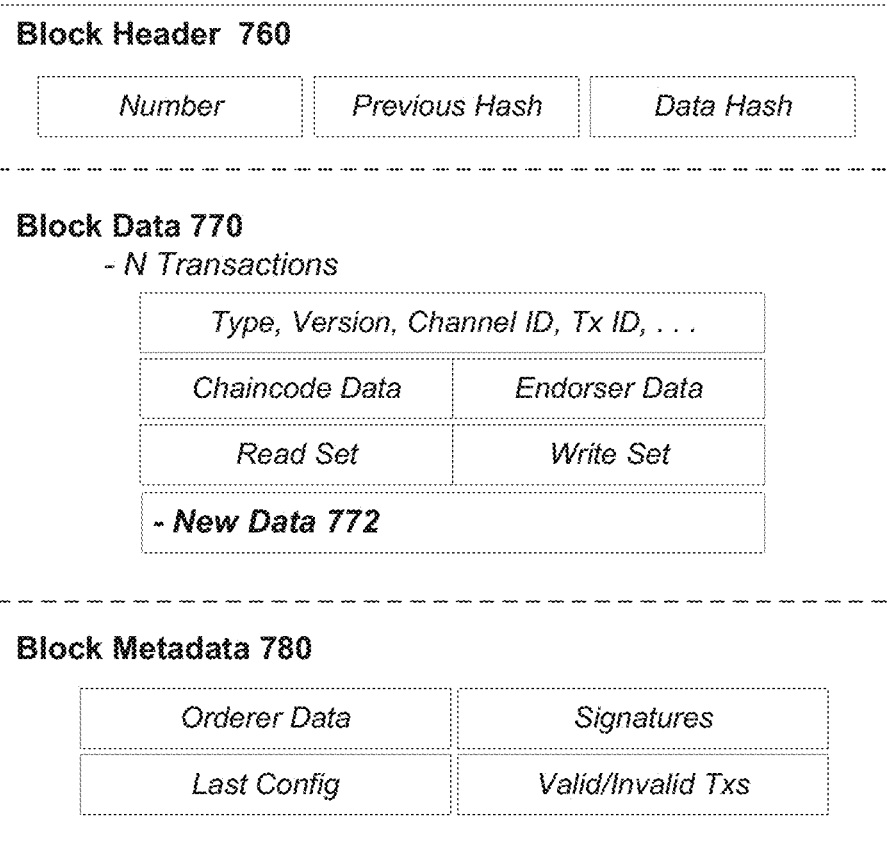
FIG. 7B illustrates contents a data block including the new data, according to example embodiments.

FIG. 7A illustrates a process 700 of a new block being added to a distributed ledger 730, according to example embodiments, and FIG. 7B illustrates contents of a block structure 750 for blockchain, according to example embodiments. Referring to FIG. 7A, clients (not shown) may submit transactions to blockchain nodes 721, 722, and/or 723. Clients may be instructions received from any source to enact activity on the blockchain 730. As an example, clients may be applications that act on behalf of a requester, such as a device, person or entity to propose transactions for the blockchain. The plurality of blockchain peers (e.g., blockchain nodes 721, 722, and 723) may maintain a state of the blockchain network and a copy of the distributed ledger 730. Different types of blockchain nodes/peers may be present in the blockchain network including endorsing peers which simulate and endorse transactions proposed by clients and committing peers which verify endorsements, validate transactions, and commit transactions to the distributed ledger 730. In this example, the blockchain nodes 721, 722, and 723 may perform the role of endorser node, committer node, or both.

The distributed ledger 730 includes a blockchain 732 which stores immutable, sequenced records in blocks, and a state database 734 (current world state) maintaining a current state of the blockchain 732. One distributed ledger 730 may exist per channel and each peer maintains its own copy of the distributed ledger 730 for each channel of which they are a member. The blockchain 732 is a transaction log, structured as hash-linked blocks where each block contains a sequence of N transactions. Blocks may include various components such as shown in FIG. 7B. The linking of the blocks (shown by arrows in FIG. 7A) may be generated by adding a hash of a prior block's header within a block header of a current block. In this way, all transactions on the blockchain 732 are sequenced and cryptographically linked together preventing tampering with blockchain data without breaking the hash links. Furthermore, because of the links, the latest block in the blockchain 732 represents every transaction that has come before it. The blockchain 732 may be stored on a peer file system (local or attached storage), which supports an append-only blockchain workload.

The current state of the blockchain 732 and the distributed ledger 732 may be stored in the state database 734. Here, the current state data represents the latest values for all keys ever included in the chain transaction log of the blockchain 732. Chaincode invocations execute transactions against the current state in the state database 734. To make these chaincode interactions extremely efficient, the latest values of all keys are stored in the state database 734. The state database 734 may include an indexed view into the transaction log of the blockchain 732, it can therefore be regenerated from the chain at any time. The state database 734 may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. When an endorsing node endorses a transaction, the endorsing nodes creates a transaction endorsement which is a signed response from the endorsing node to the client application indicating the endorsement of the simulated transaction. The method of endorsing a transaction depends on an endorsement policy which may be specified within chaincode. An example of an endorsement policy is "the majority of endorsing peers must endorse the transaction." Different channels may have different endorsement policies. Endorsed transactions are forward by the client application to ordering service 710.

The ordering service 710 accepts endorsed transactions, orders them into a block, and delivers the blocks to the committing peers. For example, the ordering service 710 may initiate a new block when a threshold of transactions has been reached, a timer times out, or another condition. In the example of FIG. 7A, blockchain node 722 is a committing peer that has received a new data block 750 for storage on blockchain 730.

The ordering service 710 may be made up of a cluster of orderers. The ordering service 710 does not process transactions, smart contracts, or maintain the shared ledger. Rather, the ordering service 710 may accept the endorsed transactions and specifies the order in which those transactions are committed to the distributed ledger 730. The architecture of the blockchain network may be designed such that the specific implementation of 'ordering' (e.g., Solo, Kafka, BFT, etc.) becomes a pluggable component.

Transactions are written to the distributed ledger 730 in a consistent order. The order of transactions is established to ensure that the updates to the state database 734 are valid when they are committed to the network. Unlike a cryptocurrency blockchain system (e.g., Bitcoin, etc.) where ordering occurs through the solving of a cryptographic puzzle, or mining, in this example the parties of the distributed ledger 730 may choose the ordering mechanism that best suits that network.

When the ordering service 710 initializes a new block 750, the new block 750 may be broadcast to committing peers (e.g., blockchain nodes 721, 722, and 723). In response, each committing peer validates the transaction within the new block 750 by checking to make sure that the read set and the write set still match the current world state in the state database 734. Specifically, the committing peer can determine whether the read data that existed when the endorsers simulated the transaction is identical to the current world state in the state database 734. When the committing peer validates the transaction, the transaction is written to the blockchain 732 on the distributed ledger 730, and the state database 734 is updated with the write data from the read-write set. If a transaction fails, that is, if the committing peer finds that the read-write set does not match the current world state in the state database 734, the transaction ordered into a block will still be included in that block, but it will be marked as invalid, and the state database 734 will not be updated.

Referring to FIG. 7B, a block 750 (also referred to as a data block) that is stored on the blockchain 732 of the distributed ledger 730 may include multiple data segments such as a block header 760, block data 770, and block metadata 780. It should be appreciated that the various depicted blocks and their contents, such as block 750 and its contents. shown in FIG. 7B are merely for purposes of example and are not meant to limit the scope of the example embodiments. In some cases, both the block header 760 and the block metadata 780 may be smaller than the block data 770 which stores transaction data, however this is not a requirement. The block 750 may store transactional information of N transactions (e.g., 100, 500, 1000, 2000, 3000, etc.) within the block data 770. The block 750 may also include a link to a previous block (e.g., on the blockchain 732 in FIG. 7A) within the block header 760. In particular, the block header 760 may include a hash of a previous block's header. The block header 760 may also include a unique block number, a hash of the block data 770 of the current block 750, and the like. The block number of the block 750 may be unique and assigned in an incremental/sequential order starting from zero. The first block in the blockchain may be referred to as a genesis block which includes information about the blockchain, its members, the data stored therein, etc.

The block data 770 may store transactional information of each transaction that is recorded within the block 750. For example, the transaction data may include one or more of a type of the transaction, a version, a timestamp, a channel ID of the distributed ledger 730, a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, and the like. The transaction data may be stored for each of the N transactions.

In some embodiments, the block data 770 may also store data 772 which adds additional information to the hash-linked chain of blocks in the blockchain 732. Accordingly, the data 772 can be stored in an immutable log of blocks on the distributed ledger 730. Some of the benefits of storing such data 772 are reflected in the various embodiments disclosed and depicted herein.

The block metadata 780 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 710. Meanwhile, a committer of the block (such as blockchain node 722) may add validity/invalidity information based on an endorsement policy, verification of read/write sets, and the like. The transaction filter may include a byte array of a size equal to the number of transactions in the block data 770 and a validation code identifying whether a transaction was valid/invalid.

Figure 8:
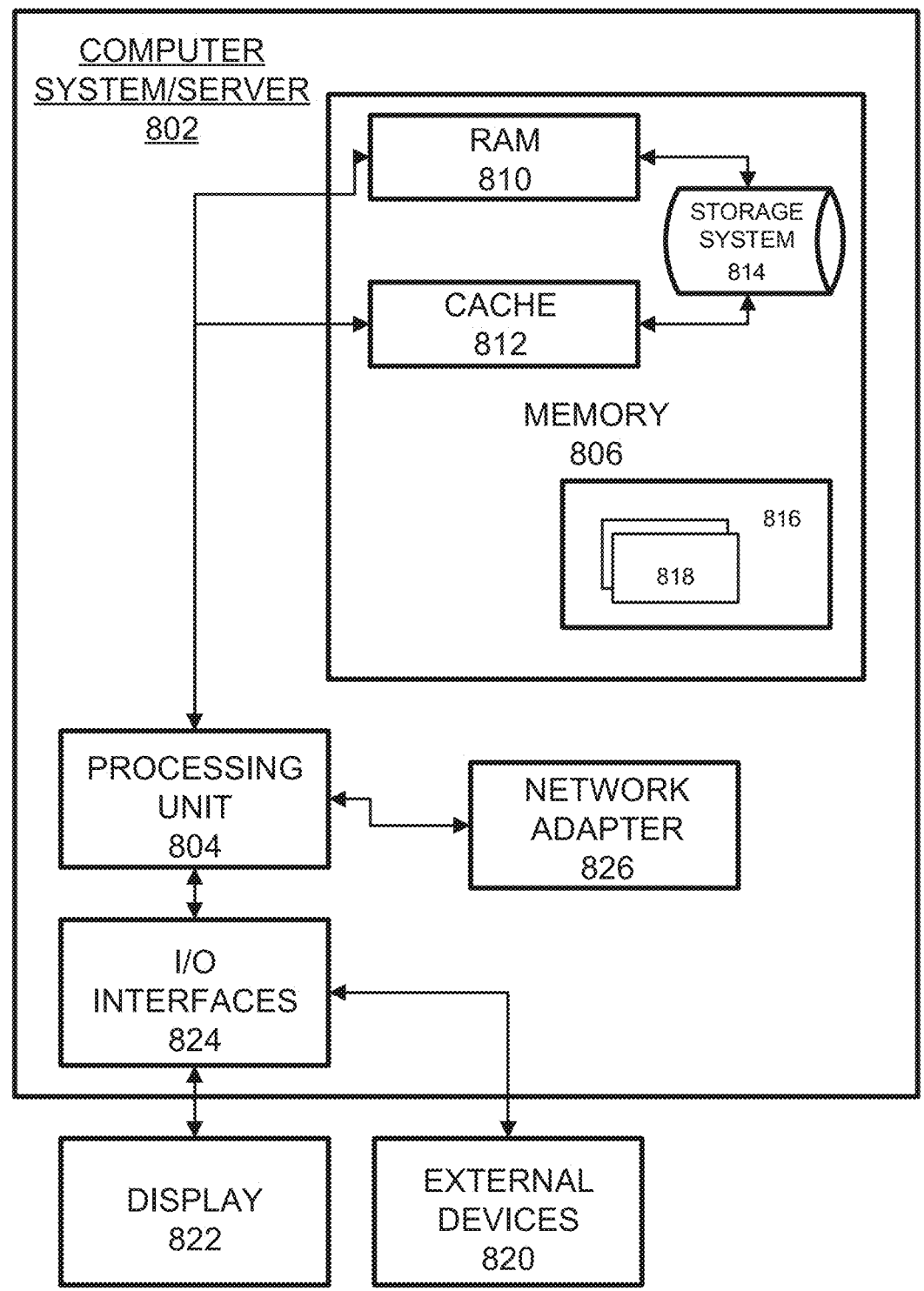
FIG. 8 illustrates an example system that supports one or more of the example embodiments.

FIG. 8 is not intended to suggest any limitation as to the scope of use or functionality of embodiments of the application described herein. Regardless, the computing node 800 is capable of being implemented and/or performing any of the functionality set forth hereinabove.

In computing node 800 there is a computer system/server 802, which is operational with numerous other general purpose or special purpose computing system environments or configurations. Examples of well-known computing systems, environments, and/or configurations that may be suitable for use with computer system/server 802 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 802 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 802 in cloud computing node 800 is shown in the form of a general-purpose computing device. The components of computer system/server 802 may include, but are not limited to, one or more processors or processing units 804, a system memory 806, and a bus that couples various system components including system memory 806 to processor 804.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media. System memory 806, in one embodiment, implements the flow diagrams of the other figures. The system memory 806 can include computer system readable media in the form of volatile memory, such as random-access memory (RAM) 810 and/or cache memory 812. Computer system/server 802 may further include other removable/non-removable, volatile/non-volatile computer system storage media. By way of example only, storage system 814 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 806 may include at least one program product having a set (e.g., at least one) of program modules that are configured to carry out the functions of various embodiments of the application.

Program/utility 816, having a set (at least one) of program modules 818, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. Program modules 818 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 802 may also communicate with one or more external devices 820 such as a keyboard, a pointing device, a display 822, etc.; one or more devices that enable a user to interact with computer system/server 802; and/or any devices (e.g., network card, modem, etc.) that enable computer system/server 802 to communicate with one or more other computing devices. Such communication can occur via I/O interfaces 824. Still yet, computer system/server 802 can communicate with one or more networks such as a local area network (LAN), a general wide area network (WAN), and/or a public network (e.g., the Internet) via network adapter 826. As depicted, network adapter 826 communicates with the other components of computer system/server 802 via a bus. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A system, comprising:
a processor configured to:
receive a blockchain transaction request for a plurality of transactions defined by one or more smart contracts,
determine, from the blockchain transaction request, a plurality of nodes for processing the plurality of transactions, respectively,
predict availabilities of the plurality of nodes based on user activity at the plurality of nodes,
determine preferred transaction times for the plurality of transactions based on the predicted availabilities of the plurality of nodes and add the preferred transaction times to the blockchain transaction request, and
transmit the blockchain transaction request including the preferred transaction times to a blockchain node.

2. The system of claim 1 wherein the plurality of transactions comprise a series of interlinked transactions corresponding to a plurality of users included in a workflow.

3. The system of claim 1 wherein the processor is configured to:
receive social network usage data of the plurality of nodes; and
predict the availabilities at the plurality of nodes based on the social network usage data of the plurality of nodes.

4. The system of claim 1 wherein the processor is configured to predict the plurality of nodes involved in the plurality of transactions based on timing relationships of users of the plurality of nodes in processing previous blockchain transactions.

5. The system of claim 1 wherein the processor is further configured to:
predict a series of transactions that will occur subsequent to the blockchain transaction request;
predict user availability at the plurality of nodes where the series of transactions will be performed; and
determine a preferred time for execution of the blockchain transaction based on the user availability at the plurality of nodes.

6. The system of claim 1 wherein users are required to provide input into the plurality of nodes for processing the plurality of transactions.

7. A method comprising:
receiving a blockchain transaction request for a plurality of transactions defined by one or more smart contracts;
determining, from the blockchain transaction request, a plurality of nodes for processing the plurality of transactions, respectively;
predicting availabilities of the plurality of nodes based on user activity at the plurality of nodes;
determining preferred transaction times for the plurality of transactions based on the predicted availabilities of the plurality of nodes and adding the preferred transaction times to the blockchain transaction request; and
transmitting the blockchain transaction request including the preferred transaction times to a blockchain node.

8. The method of claim 7 wherein the plurality of transactions comprise a series of interlinked transactions corresponding to a plurality of users included in a workflow.

9. The method of claim 7 wherein the predicting comprises receiving social network usage data of the plurality of nodes, and predicting user availability at the plurality of nodes based on the social network usage data of the plurality of nodes.

10. The method of claim 7 wherein the method further comprises predicting the plurality of nodes involved in the plurality of transactions based on timing relationships of users of the plurality of nodes in processing previous blockchain transactions.

11. The method of claim 7 further comprising storing the predicted availabilities of the plurality of nodes in an availability server.

12. The method of claim 7 wherein the method further comprises predicting a series of interlinked transactions that will occur subsequent to the blockchain transaction request.

13. The method of claim 7 wherein determining the preferred times comprises executing an optimization algorithm that optimizes at least one parameter for the plurality of transactions.

14. The method of claim 7 wherein users are required to provide input into the plurality of nodes for processing the plurality of transactions.

15. A non-transitory computer readable medium comprising instructions, that when read by a processor, cause the processor to perform a method comprising:
determining, from a blockchain transaction request, a plurality of nodes for processing a plurality of transactions, respectively, of the blockchain transaction request;
predicting availabilities of the plurality of nodes based on user activity at the plurality of nodes;
determining preferred transaction times for the plurality of transactions based on the predicted availabilities of the plurality of nodes and adding the preferred transaction times to the blockchain transaction request; and
transmitting the blockchain request including the preferred transaction times to a blockchain node.

16. The non-transitory computer readable medium of claim 15 wherein the predicting comprises receiving social network usage data of the plurality of nodes, and predicting the availabilities at the plurality of nodes based on the social network usage data of the plurality of nodes.

17. The non-transitory computer readable medium of claim 15 wherein the method further comprises predicting the plurality of nodes involved in the plurality of transactions based on timing relationships of users of the plurality of nodes in processing previous blockchain transactions.

* * * * *